US008559922B2

(12) United States Patent  (10) Patent No.: US 8,559,922 B2
Hardin  (45) Date of Patent: Oct. 15, 2013

(54) SYSTEM AND METHOD FOR RECEIVING USER-SPECIFIC INFORMATION OVER DIGITAL RADIO

(75) Inventor: Danny Hardin, Paragon, IN (US)

(73) Assignee: Thomson Licensing (FR)

( * ) Notice: Subject to any disclaimer, the term of this patent is extended or adjusted under 35 U.S.C. 154(b) by 926 days.

(21) Appl. No.: 11/922,445

(22) PCT Filed: Jul. 14, 2005

(86) PCT No.: PCT/US2005/025036
§ 371 (c)(1),
(2), (4) Date: Dec. 18, 2007

(87) PCT Pub. No.: WO2007/011334
PCT Pub. Date: Jan. 25, 2007

(65) Prior Publication Data
US 2009/0116584 A1  May 7, 2009

(51) Int. Cl.
*H04M 1/66* (2006.01)
*H04M 1/68* (2006.01)
*H04M 3/16* (2006.01)
*H04M 1/725* (2006.01)
*H04M 3/42* (2006.01)
*H04L 12/58* (2006.01)

(52) U.S. Cl.
USPC ...... 455/410; 455/411; 455/412.1; 455/414.1

(58) Field of Classification Search
USPC .................. 455/3.01–3.04, 3.06, 410–414.1; 725/10–11, 25, 34, 135–136, 139, 151
See application file for complete search history.

(56) References Cited

U.S. PATENT DOCUMENTS

| 6,128,334 | A | 10/2000 | Dapper et al. |
| 6,678,215 | B1 | 1/2004 | Treyz et al. |
| 7,092,992 | B1 * | 8/2006 | Yu .................................. 709/206 |
| 7,218,921 | B2 * | 5/2007 | Mendiola et al. .......... 455/414.1 |
| 7,373,650 | B1 * | 5/2008 | Rodriguez et al. ............... 725/41 |
| 7,436,939 | B1 * | 10/2008 | Packingham et al. ....... 379/88.12 |
| 7,757,261 | B2 * | 7/2010 | Addington et al. ........... 725/114 |
| 2002/0009285 | A1 * | 1/2002 | Safadi et al. .................... 386/46 |
| 2002/0009986 | A1 | 1/2002 | Bern et al. |

(Continued)

FOREIGN PATENT DOCUMENTS

| CN | 1532763 | 9/2004 |
| CN | 1571487 | 1/2005 |

(Continued)

OTHER PUBLICATIONS

International Search Report, dated Oct. 10, 2006.

*Primary Examiner* — Simon Nguyen
(74) *Attorney, Agent, or Firm* — Tutunjian & Bitetto, P.C.

(57) ABSTRACT

A system and method for permitting users to receive desired/user-specific data or information, e.g., electronic mail or other user-subscribed services, e.g., for textual information, over the airwaves via a receiver, e.g., a digital receiver. In one embodiment, an authorization process is provided wherein the receiver includes a hard-coded user ID stored thereon for comparison with an input user ID encoded with user-specific data signals. A splitter permits simultaneous processing of e.g., radio frequency signals including user-specific information via an authorization path, as well as radio frequency signals having standard audio and/or audio/video information. The authorization path includes an out-of-band tuner and an authorizing means for authorizing user-specific data transmissions for retrieval by an authorized receiver.

18 Claims, 3 Drawing Sheets

(56) References Cited

U.S. PATENT DOCUMENTS

| | | |
|---|---|---|
| 2002/0087628 A1 | 7/2002 | Rouse et al. |
| 2003/0028605 A1* | 2/2003 | Millett et al. ............... 709/206 |
| 2003/0219127 A1* | 11/2003 | Russ et al. .................. 380/239 |
| 2004/0049389 A1* | 3/2004 | Marko et al. ............... 704/260 |
| 2004/0242205 A1 | 12/2004 | Yamane et al. |
| 2005/0147247 A1* | 7/2005 | Westberg et al. ........... 380/200 |
| 2005/0162267 A1* | 7/2005 | Khandelwal et al. ....... 340/506 |
| 2005/0289095 A1* | 12/2005 | Rauhala et al. ................ 707/1 |
| 2006/0053279 A1* | 3/2006 | Coueignoux ................ 713/154 |
| 2006/0234685 A1* | 10/2006 | McDonough et al. ..... 455/414.1 |
| 2007/0053513 A1* | 3/2007 | Hoffberg .................... 380/201 |
| 2007/0277201 A1* | 11/2007 | Wong et al. ................... 725/40 |
| 2008/0119132 A1* | 5/2008 | Rao ............................. 455/3.04 |
| 2009/0210916 A1* | 8/2009 | Lajoie et al. .................. 725/98 |
| 2012/0110611 A1* | 5/2012 | Seidel et al. ................... 725/28 |

FOREIGN PATENT DOCUMENTS

| | | |
|---|---|---|
| EP | 1072139 | 1/2001 |
| EP | 1148747 | 10/2001 |
| JP | 1141581 | 6/1989 |
| JP | 9214445 | 8/1997 |
| JP | 2001136015 | 5/2001 |
| WO | WO2005015793 | 2/2005 |

* cited by examiner

SYSTEM AND METHOD FOR RECEIVING USER-SPECIFIC INFORMATION OVER DIGITAL RADIO

This application claims the benefit, under 35 U.S.C. §365 of International Application PCT/US2005/025036, filed Jul. 14, 2005, which was published in accordance with PCT Article 21(2) on Jan. 25, 2007, in English.

TECHNICAL FIELD OF THE INVENTION

The present invention generally relates to digital communication and, more particularly, to a system and method for sending user-specific information, e.g., electronic mail, over the airwaves to a digital receiver.

BACKGROUND OF THE INVENTION

Digital audio broadcasting (also known as digital radio and high definition radio) is an emerging transmission system involving audio broadcasting in which analog audio is converted into a digital signal and transmitted on an assigned channel in the AM, or more typically, the FM frequency range. Typically, digital radio works by utilizing both MPEG and COFDM (Coded Orthogonal Frequency Division Multiplex) technology which converts e.g., music or speech from analogue signal into digital (binary) code. This greatly reduces the potential for the broadcast to be corrupted during transmission due to weather conditions and other problems such as local sources of interference that can degrade the quality of reception.

Digital audio broadcast signals are transmitted in-band, on-channel, and several stations can be carried within the same frequency spectrum. To receive digital radio signals, users must have a receiver equipped to handle DAB signals; a DAB receiver typically includes a small display for providing information about, e.g., the audio content, up-to-the-minute news, sports, weather headlines, etc.

Along with music and speech, digital radio transmission may also contain data information such as information about the program currently being listened to, such as a song title, as well as news headlines and other general up-to-date information.

The prior art discusses various digital radio devices, including e.g., an alarm clock radio which may be enabled to receive content such as e-mail. Details of this alarm clock radio are disclosed in U.S. Pat. No. 6,678,215. However, to receive the e-mail, such alarm clock radio must have access to a mail server over a communications network (i.e., Internet, public switched telephone network, etc), or be connected to a computer, also via the communications network.

SUMMARY

The present invention to provide a system and method for providing a user with the ability to receive information including e.g., e-mails in a manner having improved convenience and efficiency that overcomes the limitations of the prior art.

The present invention permits users to receive user-specific information (e.g., an e-mail message) without e.g., a computer and/or requiring logging in to a network, via transmission of user-specific information over airwaves. In one embodiment, the user-specific information may be viewable/retrievable on a digital radio device by tuning to an appropriate channel.

In its heretofore disclosed system and method, the present invention addresses the prior art limitations described above by obviating the need for, e.g., mail servers, computers, or connection to a communication network to receive user-specific information (e.g., electronic mail) and accordingly, provides greater flexibility, portability and convenience for a user to receive user-specific information while maintaining security and destination accuracy during transmission of same.

In one aspect, an apparatus for receiving user-specific data via radio frequency signals is provided comprising a first switch for switching between a cable input and an antenna input, a second switch for allowing either the cable input or the antenna input to be routed through a main tuner, a filter for permitting throughput of a signal including the user-specific data to an out-of-band tuner, and a splitter for enabling simultaneous operation of the main tuner and the out-of-band tuner, wherein the out-of-band tuner processes the signal including the user-specific data.

In another aspect, the present invention provides a system for receiving user-specific data via radio frequency signals comprising a receiver having an authorization path including an out-of-band tuner which processes the signal including the user-specific data encoded with an input user ID, wherein the user-specific data is retrievable by an authorized receiver.

In yet another aspect, the present invention provides a method for receiving user-specific data via radio frequency signals comprising the steps of receiving a radio frequency signal via a receiver from a transmitter on a designated channel, said signal including the user-specific data encoded with an input user ID, authorizing the user-specific data, and retrieving from the designated channel the user-specific data by an authorized receiver.

These, and other aspects, features and advantages of the present invention will be described or become apparent from the following detailed description of the preferred embodiments, which is to be read in connection with the accompanying drawings.

BRIEF DESCRIPTION OF THE DRAWINGS

In the drawings, wherein like reference numerals denote similar elements throughout the views.

It should be understood that the drawings are for purposes of illustrating the concepts of the invention and are not necessarily the only possible configuration for illustrating the invention.

DETAILED DESCRIPTION OF PREFERRED EMBODIMENTS

The present invention provides a system and method for allowing users to receive desired/user-specific data or information, e.g., electronic mail or other user-subscribed services, e.g., for textual information, over the airwaves via a receiver, e.g., a digital radio device. For example, a service provider may designate a channel of a Digital Radio spectrum and send e-mail via transmission over the airwaves to a consumer on the designated channel. That is, using frequencies allotted for Digital Radio, one channel could be set aside for information such as e-mail, or other services which the user may choose to subscribe to, e.g., pay services for talk radio programs, audio magazine subscriptions, etc. The user receives the desired information via a receiver, e.g., a digital radio device, and tunes to the designated channel on the Digital Radio. Upon tuning to the correct channel, the user-specific information (e.g., e-mail) may be viewable on a Digital Radio display or translated via a text-to-speech converter (which may be built into the digital radio device) into an audio stream and read to the user.

The information that the consumer desires to receive on their receiver may preferably be encoded with information that would be keyed to only permit a particular receiver/Digital Radio/user to receive it. This would facilitate the transmission of information to authorized user(s) only. The designated channel may be shared by different users with each person having a key/user ID for receiving information sent to them.

In one embodiment, if more than just one type of user-specific information (e.g., e-mail) is available on a single designated channel, the user may select between the types of information desired to be transmitted to their receiver, e.g., by calling the service provider, entering a personal ID code and selecting the desired application for transmission to their receiver. Alternatively, a transmitter may be designed (e.g., based on cell phone technology) that could be used for communicating to the service provider to send particular content.

It should be understood that the elements shown in the FIGS. may be implemented in various forms of hardware, software or combinations thereof. Preferably, these elements are implemented in combinations of hardware and software on one or more appropriately programmed general-purpose devices, which may include a processor, memory and input/output interfaces.

Figure 1:
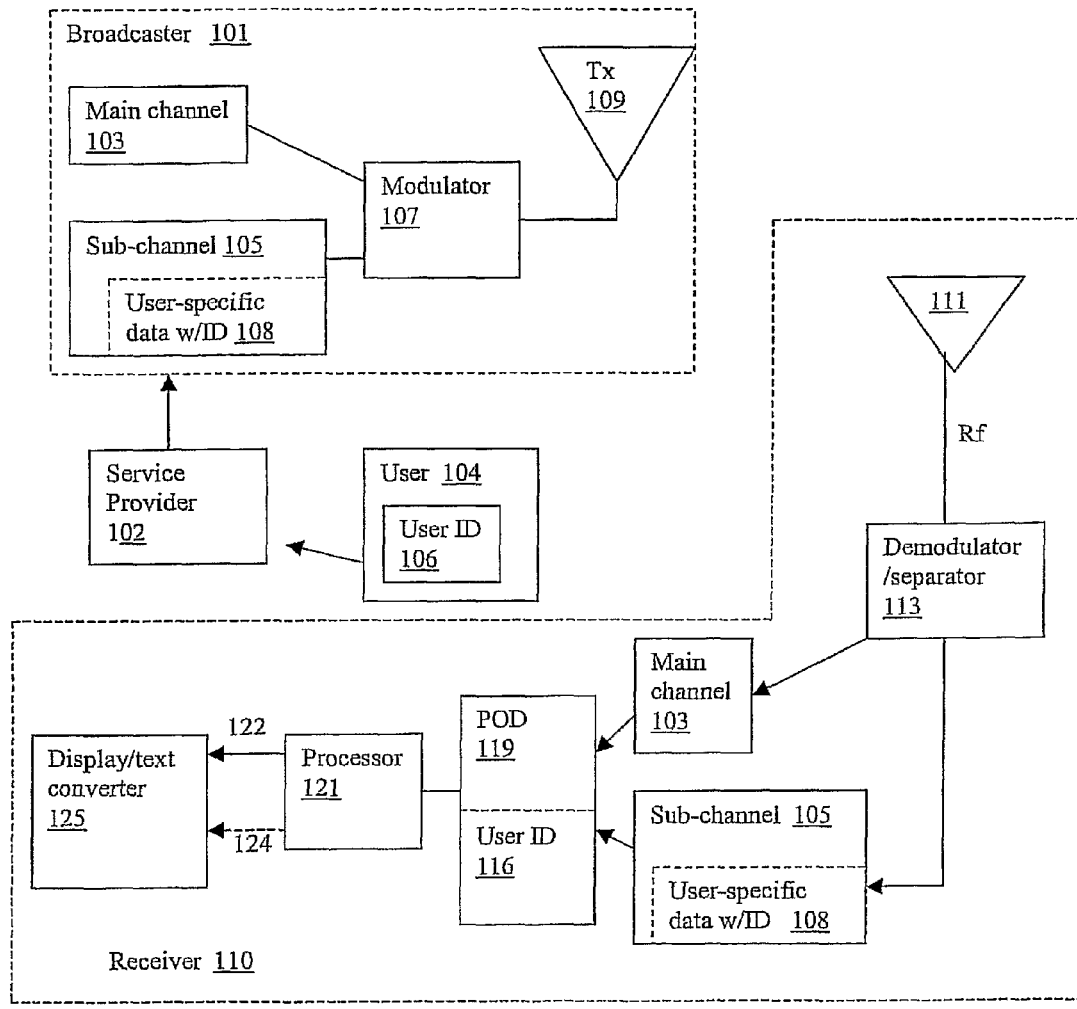
FIG. 1 is a schematic diagram of an exemplary system according to an aspect of the present invention.

Referring now to the Figures, in FIG. 1 an exemplary system according to the present invention includes a broadcaster 101 which receives data, preferably user-specific information from a service provider 102. Such data may comprise any information (e.g., textual information) which is specific to or subscribed to by individual users, e.g., e-mail, text subscriptions, or any other information which a user may subscribe to receive. The service provider 102 may provide various services, such as e-mail over airwaves or text subscription services, such as daily newspapers, magazines, etc. which a user 104 may agree to subscribe to.

In one embodiment, user 104 contacts the service provider 102 when a request for user-specific data is desired and preferably provides the service provider with a user ID (key information) 106. The service provider 102 sends the user-specific data pertaining to the user 104 request encoded with the user ID 106 to the broadcaster 101. The broadcaster 101 assigns the user-specific data with user ID 108 to a separate channel (sub-channel 105). The sub-channel 105 is combined with a main channel 103 carrying e.g., all other data to be broadcast (e.g., non-user specific audio or audio/video data such as music, television broadcasts, etc.) via modulator 107 and transmitted as radio frequency signals via transmitter 109.

A receiver 110 having antenna 111 decodes and separates the transmission via demodulator/separator 113. The main channel 103 is separated from the sub-channel 105 and both are input through a Point of Deployment (POD) decoder 119 and processor 121. The POD 119 or processor 121 includes a hard-coded (pre-entered) user-ID stored thereon which is checked against the user ID sent with the user-specific data 108. If a match is verified, the sub-channel 105 is processed and passed through (e.g., as data path 124) for display/text-to-speech conversion 125 of the data to the user, along with data from the main channel 103 (e.g., main path 122). That is, the data path 124 may be received by the user visually via a display, or via audible means, e.g., the receiver 110 may include a text-to-speech converter for facilitating reading of the data to the user.

Figure 2:
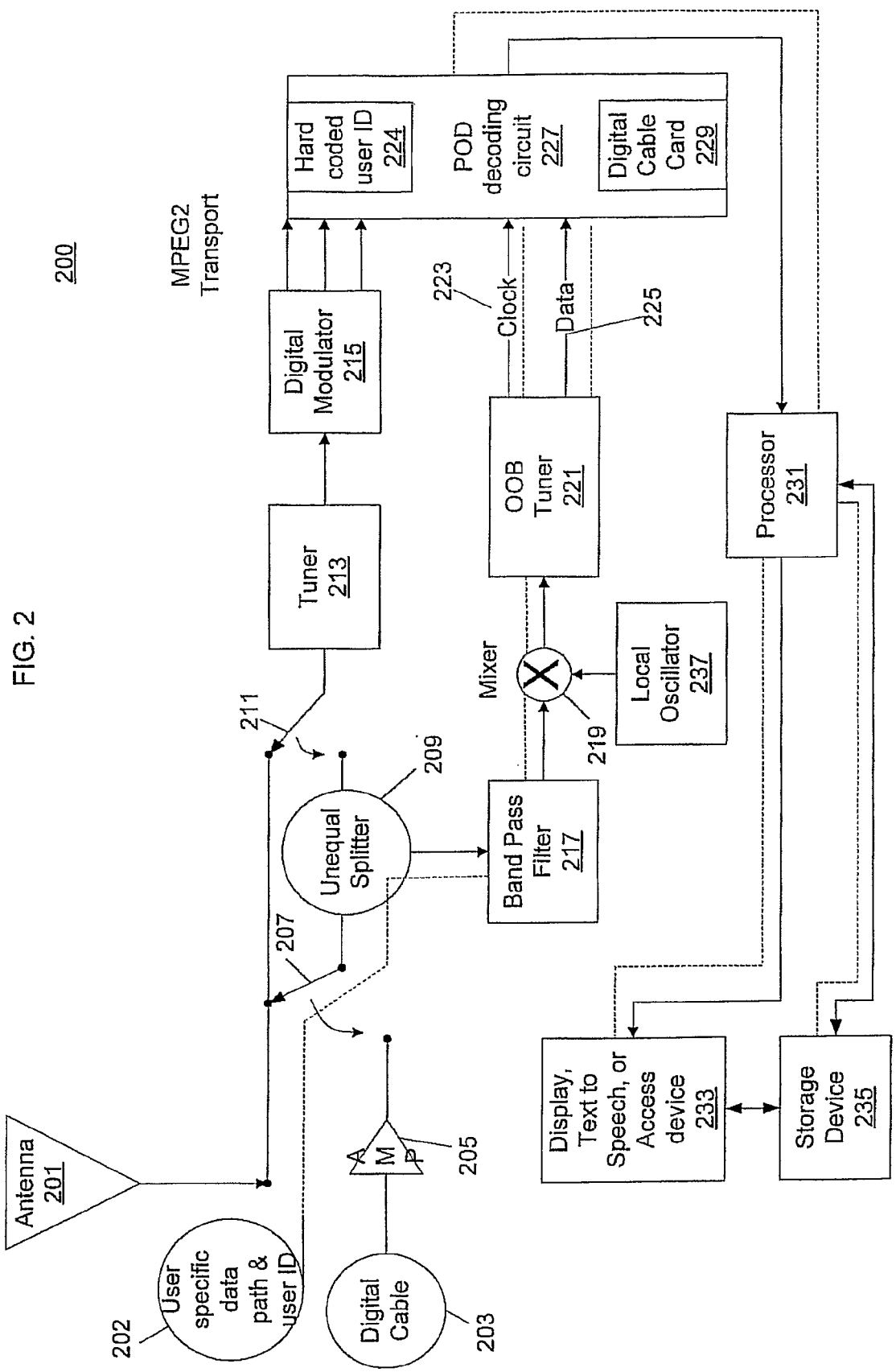
FIG. 2 illustrates exemplary circuitry of an apparatus for receiving user-specific information over airwaves according to an aspect of the present invention.

FIG. 2 illustrates an exemplary circuitry configuration of an apparatus for receiving user-specific information over airwaves according to an aspect of the present invention. The apparatus comprises a receiver device, and preferably is a digital receiver (e.g., includes at least a digital demodulator). The receiver may comprise a digital radio device, a set-top box, a computer, a television, high-definition television (HDTV), etc. Antenna 201 is provided for radio frequency (RF) input and a digital cable input 203 with amplifier 205 may also be provided. A first switch 207 is provided for enabling switching between a cable input via 203 and transmissions via antenna 201. A second switch 211 and an unequal splitter 209 are provided for switching between a signal including no user-specific data (this signal is routed directly into the tuner 213 to allow for minimal signal loss) or a signal including user-specific data requiring both the main tuner 213 and the OOB tuner 221 (this signal is then split via the unequal splitter 209 to allow for proper signal level at both tuner 213 and OOB tuner 221). That is, the second switch 211 allows for a signal from either the antenna 201 or cable input 203 to be routed through tuner 213. Splitter 209 allows for dual tuner operation; e.g., simultaneous operation of OOB tuner 221 and 'main' tuner 213. Advantageously, this allows for processing of e.g., a sub-channel having user-specific data via the OOB tuner 221 at the same time that, e.g., audio or audio/video data from a main channel is processed via the 'main' tuner 213.

A switching system according to this embodiment permits switching between a standard RF input path through the tuner 213 (e.g., a TV/audio tuner) for receiving and processing standard radio frequency transmissions (radio, television broadcast signals, etc.), and an authorization path which includes an out-of-band tuner/demodulator and a Point of Deployment (POD) decoding circuit device 227 for processing and authorizing user-specific data transmissions. For example, the implementation and use of a separate OOB tuner 221 in conjunction with a POD decoding circuit 227 and processor 231 facilitates proper and authorized transmission of user-specific data to authorized users.

In one embodiment as shown in FIG. 2, user-specific data may be received and processed as shown by user-specific data path 202. The first switch 207 is switched to an 'antenna input' position and Rf signals including the user-specific data signal with encoded user ID (e.g., a sub-channel including e-mail data and a user ID) may be received via antenna input 201, passed through unequal splitter 209, and filtered by band pass filter 217 for processing of, e.g., only the sub-channel signal having the user-specific data. The signals including user-specific data are processed through mixer 219 and local oscillator 237. At OOB tuner 221, the signals including the user-specific data are converted from RF into a digital bit stream 225 (e.g., the sub-channel including the user-specific data is converted from RF into a digital format) and control clock 223 (user for synchronizing the data 225). The data 225 and clock 223 are input into a Point of Deployment (POD) decoding circuit 227 for decoding and validation. The POD 227 may include a digital cable card 229 as is known in the art for decoding and validation and enables a valid data stream to be sent to processor 231. Either POD 227 or processor 231 may include, e.g., stored thereon, a hard-coded (pre-entered) user ID code or key information 224.

In this embodiment, the POD 227 includes the hard-coded user ID 224 and checks for a match between the hard-coded ID 224 and the user ID encoded with the data path 202. If there is a match, the POD 227 passes through the data signal 225 along with, e.g., any clock 223 to the processor 231 for either display or reading to the user (via text-to-voice converter) at access device 233. A storage device 235 may be included operably connected to the processor 231 for, e.g., storing the user-specific data, or any other data or programs. The storage device 235, whether removable or built into the circuitry, facilitates the capturing of user-specific data shortly after transmission, and is advantageous in the event of large amounts of user-specific data being transmitted over a short period of time. In addition, the storage device 235 permits a user to wait a desired amount of time before retrieving the user-specific data (e.g., the user may not be tuned to the proper "e-mail channel" during transmission and without a storage device, would thus otherwise lose information). The hard-coded user ID 224 may be stored in the form of a card or device supplied by the service provider 102, may be programmed into the storage device 235, built into on-board circuitry such as flash memory, or may be associated with the cable card security certificate built into the cable card 229.

Figure 3:
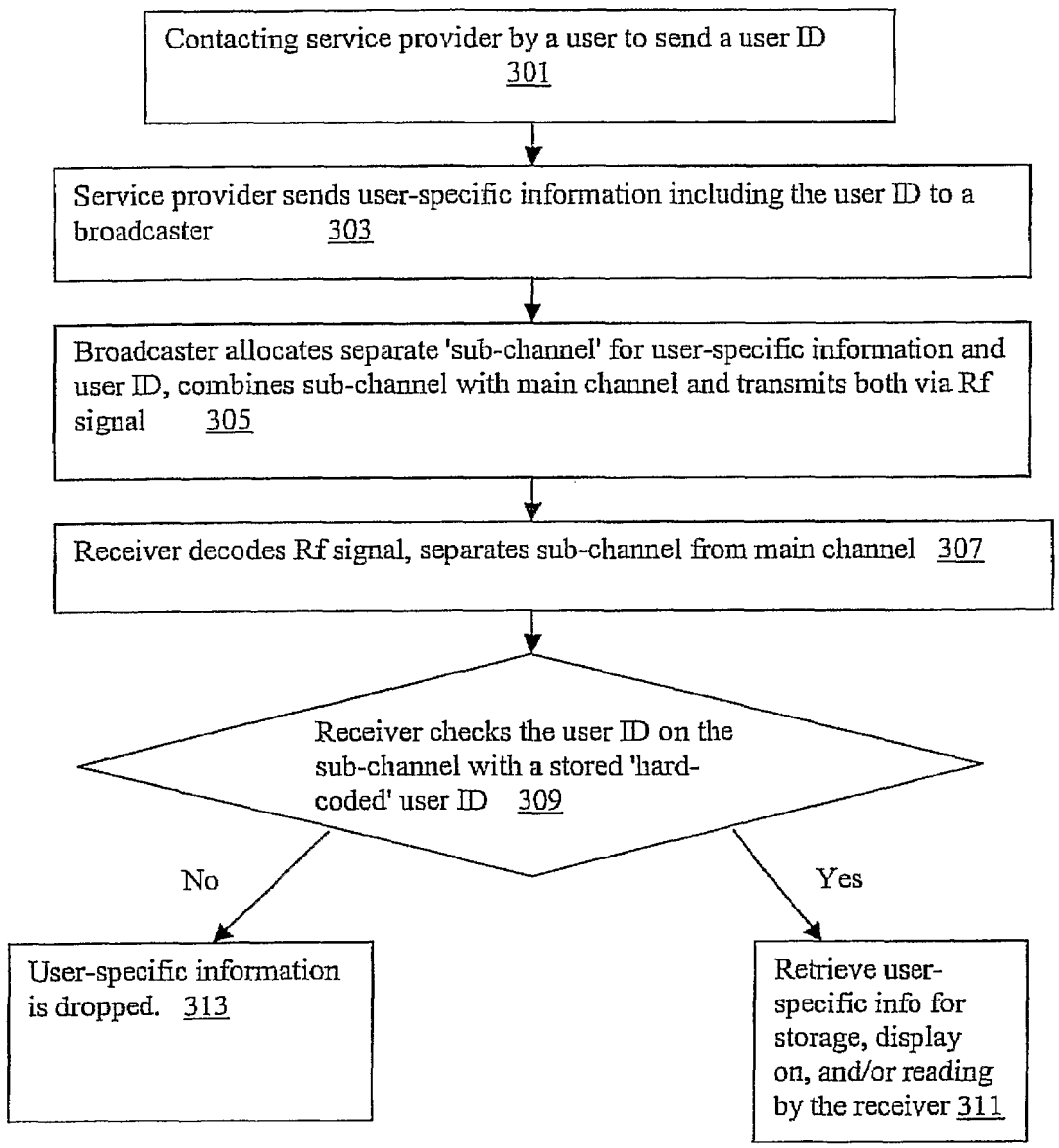
FIG. 3 is an flowchart of an exemplary method for receiving user-specific information over airwaves according to an aspect of the present invention.

FIG. 3 is an flowchart of an exemplary method for receiving user-specific information over airwaves according to an aspect of the present invention. In step 301, a user contacts a service provider and provides a unique user ID or key, and optionally, a request for user-specific data. The service provider sends the requested user-specific information encoded with the user ID to a broadcaster (step 303). The broadcaster allocates the user-specific information and the user ID preferably on a separate channel (e.g., a 'sub-channel') from any other "main" channel(s) which may carry other information such as non-user specific data. The broadcaster combines the sub-channel (having the user-specific information and the input user ID) with the main channel(s), if any, and transmits them via a radio frequency signal (step 305).

A receiver decodes the signal and separates the sub-channel from any other channels (e.g., the 'main' channel) it may have been transmitted with (step 307). Decision step 309 is an authorization step in which it is assessed whether there is a match between a hard-coded user ID stored at the receiver and the input user ID transmitted from the broadcaster on the sub-channel. If yes, the receiver is, e.g., deemed an 'authorized receiver,' and the user-specific information on the sub-channel may be retrieved/authorized for display on/reading by the authorized receiver (step 311). Alternatively, the user-specific information may be retrieved for storage on e.g., the storage device 235. If no, the user-specific information is preferably dropped from the decoded data stream or is left encrypted and the unauthorized user is prevented from accessing the user-specific data (step 313).

Although the embodiment which incorporates the teachings of the present invention has been shown and described in detail herein, those skilled in the art can readily devise many other varied embodiments that still incorporate these teachings. Having described preferred embodiments for a system and method for receiving user-specific information via radio frequency signals (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

The invention claimed is:

1. An apparatus for receiving user-specific data via radio frequency signals comprising:
   a broadband input and a wireless input to be selectively routed through a main tuner;
   a splitter configured to split one of the broadband input and the wireless input into a main channel signal routed to the main tuner and a sub-channel signal routed to an out-of-band tuner, the sub-channel signal comprising user-specific data and an input user ID that associates the user-specific data with a specific receiver device;
   a filter for permitting throughput of the sub-channel signal to the out-of-band tuner configured to process the user-specific data in the sub-channel signal;
   a decoding circuit having a hard-coded user ID for authorizing the user-specific data to be rendered by checking for a match between the hard-coded user ID and the transmitted input user ID; and
   a storage device configured to capture the user-specific data, to store said captured user-specific data, and to delay a user-configurable amount of time before retrieving the user-specific data.

2. The apparatus of claim 1, wherein the user-specific data comprises e-mail data.

3. The apparatus of claim 1, further comprising a processor operably connected to the decoding circuit, wherein the processor includes a hard-coded user ID.

4. The apparatus of claim 3, further comprising a text-to-speech converter for audibly rendering the user-specific data.

5. The apparatus of claim 1, further comprising a transmitter configured to communicate a preferred content of the user-specific data to a service provider.

6. A system for receiving user-specific data via radio frequency signals comprising:
   a receiver having an authorization path including a hard-coded user ID and an out-of-band tuner which processes a signal including the user-specific data transmitted with an input user ID, wherein the user-specific data is retrievable only by a single authorized receiver having the hard-coded user ID if the hard-coded user ID matches the input user ID in the signal; and
   a storage device configured to capture said user-specific data, to store said user-specific data until a user retrieves the captured data, and to delay a user-configurable amount of time before retrieving the user-specific data.

7. The system of claim 6, wherein the user-specific data comprises e-mail data.

8. The system of claim 6, wherein the authorization path includes a decoding circuit for authorizing the user-specific data.

9. The system of claim 6, wherein the receiver includes a hard-coded user ID for comparing with the input user ID.

10. The system of claim 9, wherein the authorized receiver comprises a receiver having a hard-coded user ID which matches the input user ID.

11. The system of claim 6, wherein the receiver comprises a digital radio device.

12. A method for receiving user-specific data:
    receiving a radio broadcast signal on a designated channel, said radio broadcast signal including the user-specific data and an input user ID, wherein said user-specific data is received only by a single user having the user ID hard-coded;

comparing the transmitted input user ID with a hard-coded user ID in a decoding circuit at a receiver, wherein if a match exists, the receiver is authorized;
authorizing the user-specific data;
obtaining from the designated channel the user-specific data by the authorized receiver;
capturing the user-specific data;
storing said the user-specific data until a user retrieves the captured data; and
delaying a user-configurable amount of time before retrieving the user-specific data.

13. The method of claim 12, wherein the user-specific data comprises e-mail data.

14. The method of claim 12, further comprising the step of providing a service provider for sending user-specific data and the input user ID to the transmitter.

15. The method of claim 12, further comprising the step of contacting the service provider, by a user, for providing the input user ID of the user to the service provider.

16. The method of claim 12, wherein the receiver comprises a digital receiver device.

17. The method of claim 12, wherein the user-specific data comprises user-subscribed textual data.

18. The method of claim 12, wherein the receiver comprises a digital radio device.

* * * * *